(12) United States Patent
Ueoka et al.

(10) Patent No.: US 9,148,635 B2
(45) Date of Patent: Sep. 29, 2015

(54) PROJECTION VIDEO DISPLAY DEVICE

(75) Inventors: Kazumasa Ueoka, Ibaraki (JP); Shinro Inui, Ibaraki (JP); Chohei Ono, Ibaraki (JP); Kazuomi Kaneko, Hitachi (JP)

(73) Assignee: HITACHI MAXELL, LTD., Osaka (JP)

( * ) Notice: Subject to any disclaimer, the term of this patent is extended or adjusted under 35 U.S.C. 154(b) by 0 days.

(21) Appl. No.: 14/351,160

(22) PCT Filed: Oct. 13, 2011

(86) PCT No.: PCT/JP2011/073593
§ 371 (c)(1),
(2), (4) Date: Apr. 28, 2014

(87) PCT Pub. No.: WO2013/054427
PCT Pub. Date: Apr. 18, 2013

(65) Prior Publication Data
US 2014/0300829 A1    Oct. 9, 2014

(51) Int. Cl.
*H04N 9/31* (2006.01)
*G03B 21/14* (2006.01)

(52) U.S. Cl.
CPC ............ *H04N 9/3132* (2013.01); *G03B 21/145* (2013.01)

(58) Field of Classification Search
USPC ......................................................... 348/789
See application file for complete search history.

(56) References Cited

U.S. PATENT DOCUMENTS

| | | | |
|---|---|---|---|
| 5,418,586 A * | 5/1995 | Fujimori et al. | 353/122 |
| 6,113,240 A * | 9/2000 | Iizuka | 353/31 |
| 6,139,154 A | 10/2000 | Haba | |
| 6,425,667 B1 | 7/2002 | Haba | |

FOREIGN PATENT DOCUMENTS

| | | |
|---|---|---|
| JP | 11-231417 A | 8/1999 |
| JP | H11-344767 A | 12/1999 |
| JP | 2000-305164 A | 11/2000 |
| JP | 2001-021990 A | 1/2001 |
| JP | 2004-62000 A | 2/2004 |
| JP | 2004-240024 A | 8/2004 |
| JP | 2005-62762 A | 3/2005 |
| JP | 2007-256318 A | 10/2007 |
| JP | 2008-164917 A | 7/2008 |

OTHER PUBLICATIONS

Office Action, mailed Apr. 7, 2015, which issued during the prosecution of Japanese Application No. 2013-538402, which corresponds to the present application.
Office Action, mailed Jun. 9, 2015, which issued during the prosecution of Chinese Patent Application No. 201180074089.0, which corresponds to the present application.

\* cited by examiner

*Primary Examiner* — Michael Teitelbaum
(74) *Attorney, Agent, or Firm* — Baker Botts L.L.P.

(57) ABSTRACT

Provided is a projection video display device with which precision of location of each component of the optical engine and the projection optical assembly is maintained and display video quality not impaired even if exterior force is sustained. A projection video display device comprises an optical engine (2) which projects light which is emitted from a light source (21) upon a liquid-crystal panel (231) and forms a video, and a projection optical assembly (3) which projects an enlargement of the video which is emitted from the optical engine (2). The projection optical assembly (3) and the optical engine (2) are configured to be anchored to a common base (4) which retains these in an integrated manner, with the common base (4) being attached to the casing of the device.

3 Claims, 2 Drawing Sheets

PROJECTION VIDEO DISPLAY DEVICE

TECHNICAL FIELD

The present invention relates to a projection video display device.

BACKGROUND

Projection video display devices such as a liquid crystal projector irradiate a display element such as a liquid crystal panel with light emitted from a light source such as a mercury lamp, and enlarges and projects a video formed by the display element with a projection lens onto a screen. The configuration of an optical system of the device includes an optical unit from irradiation with light emitted from the light source on the liquid crystal panel to formation of the video (hereinafter, referred to as an optical engine) and a projection optical system which enlarges and projects the video formed by the liquid crystal panel with the projection lens. In an optical engine of a color video display device, three liquid crystal panels for three primary colors (RGB) as display elements, a color separation system for irradiation light, and a color synthesis system for respective video colors are provided. Moreover, for adjusting a video-displaying position on the screen, a lens shifting mechanism is provided in the projection optical system which can move a projection lens in a direction perpendicular to an optical axis.

The optical engine and the projection optical system are positioned with respect to each other and are accommodated in a case of the device. In a conventional accommodating method, as described in Patent Literature 1, for example, respective components of the optical engine including the light source are accommodated and arranged in a light guide as an optical components case, and the light guide is fixed to the case of the device. The projection optical system is configured to be joined and fixed to an outgoing end portion of the light guide.

CITATION LIST

Patent Literature

PTL 1: Japanese Patent Application Laid-Open No. 2004-240024

SUMMARY OF INVENTION

Technical Problem

In the conventional structure such as the one of Patent Literature 1, the respective components of the optical engine are fixed to the case while being accommodated in the light guide as the optical components case. The light guide has a complicated internal structure corresponding to the shape of the respective components which are to be accommodated therein, and is generally formed of synthetic resin material by injection molding, for example. Therefore, the light guide itself has limitation on strength and can be easily deformed, as compared with metal material. Moreover, since the light guide is fixed to the case of the device, when the case is deformed by an external force, the deformation may extend to the light guide. As a result, positional accuracy between the respective optical components accommodated in the light guide may deteriorate, and, further by positional displacement with respect to the projection optical system, the quality of a video displayed on a screen may deteriorate (luminance unevenness, color shift or the like may occur).

It is therefore an object of the present invention to provide a projection video display device which can maintain positional accuracy of respective components of an optical engine and a projection optical system even when an external force is applied, and can prevent deterioration of the quality of a displayed video.

Solution to Problem

According to the present invention, in a projection video display device which projects a video formed by a display element, an optical engine which radiates light emitted from a light source on the display element to form the video and a projection optical system which enlarges and projects the video emitted from the optical engine are provided. The optical engine and the projection optical system are fixed to a common base which holds those integrally, and the common base is attached to a case of the device.

Advantageous Effects of Invention

According to the present invention, it is possible to maintain positional accuracy of respective optical components even when an external force or the like is applied, and prevent deterioration of the quality of a video to be displayed.

DESCRIPTION OF EMBODIMENTS

Figure 1:
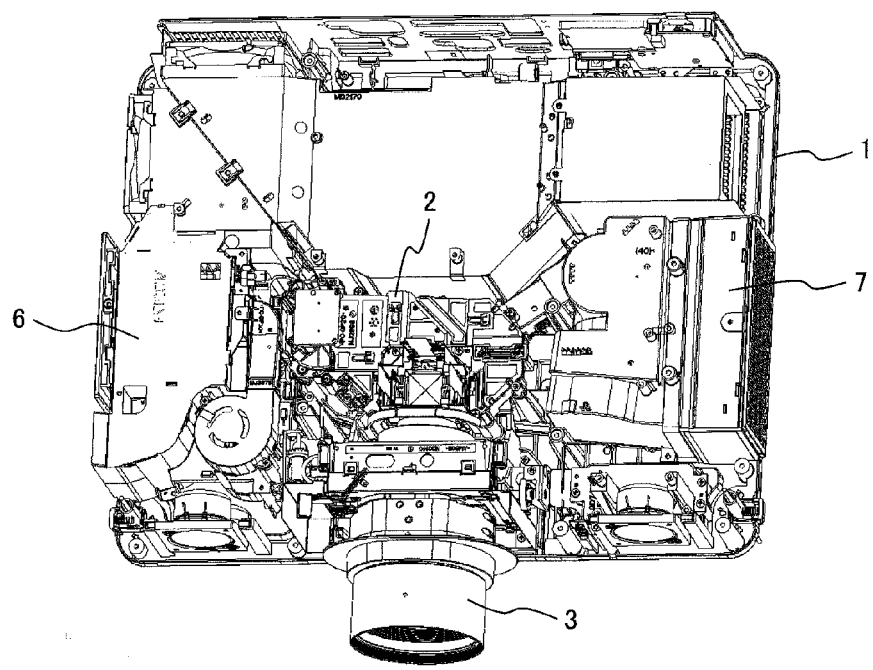
FIG. 1 is a diagram showing an entire structure of a projection video display device according to this example.

An embodiment of the present invention will be described below, referring to the drawings.

FIG. 1 is a diagram showing the entire structure of a projection video display device of this example, and shows an internal structure of the display device when a case top cover is removed. In a case 1, an optical engine 2 which emits light from a light source and radiates the light onto a liquid crystal panel as a display element to form a video, and a projection optical system 3 which enlarges and projects the video formed by the liquid crystal panel with a projection lens are accommodated. In addition to those, a power supply unit 6 and a cooling unit 7, and a video signal circuit, a control circuit, and the like which are not shown are also accommodated.

Figure 2:
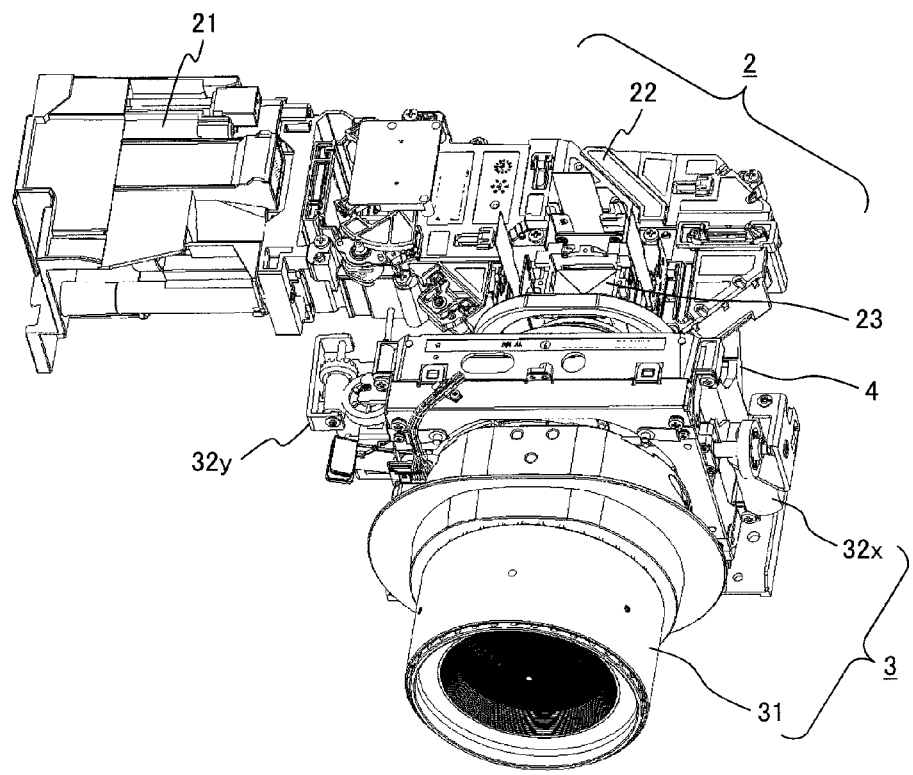
FIG. 2 is a diagram showing an optical engine and a projection optical system.
Figure 3:
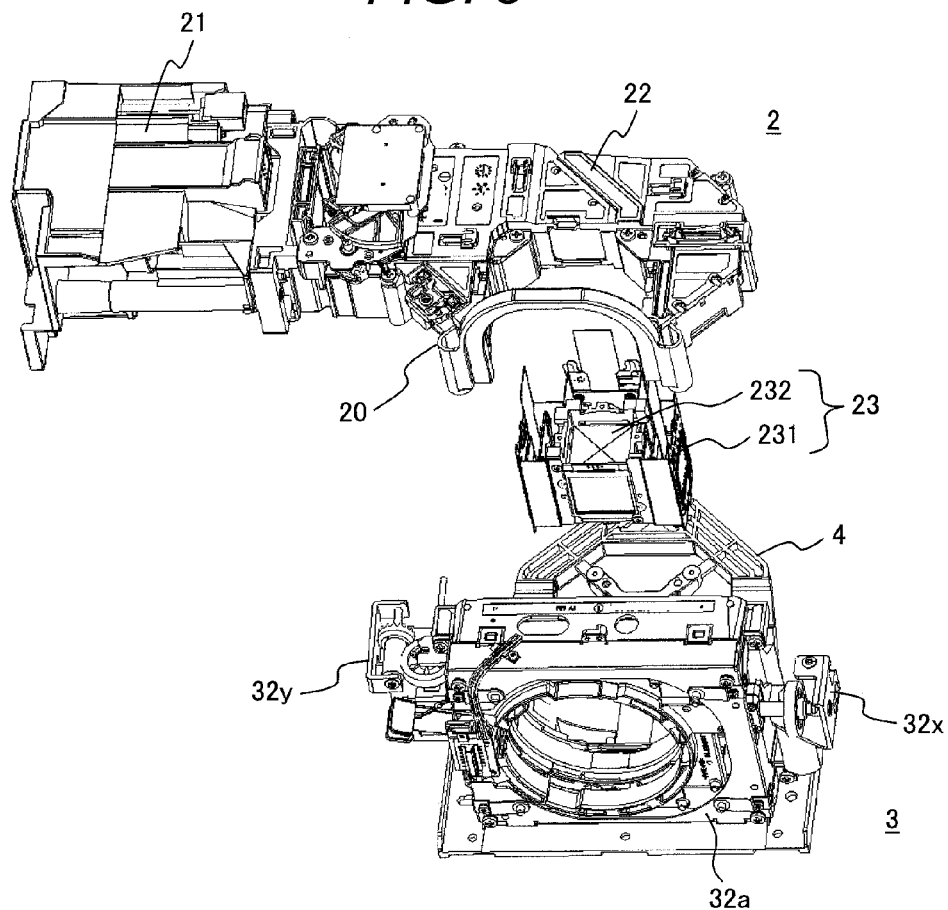
FIG. 3 is a diagram showing a state in which the optical engine and the projection optical system are detached from a common base.

FIG. 2 and FIG. 3 are diagrams showing the structures of the optical engine 2 and the projection optical system 3.

FIG. 2 shows a diagram showing a state in which the optical engine 2 and the projection optical system 3 are taken out of the case 1. The optical engine 2 and the projection optical system 3 are mounted on a common base 4 and are fixed thereto.

FIG. 3 shows a diagram showing a state in which the optical engine 2 and the projection optical system 3 are detached from the common base 4. Please note that the projection lens 31 is not shown in FIG. 3.

The optical engine 2 includes a light source portion 21, a color separation optical system 22, and a color synthesis optical system 23. Those components are accommodated in a tube-shaped light guide 20 and are fixed at predetermined positions. A light source such as an ultra-high pressure mercury lamp is used in the light source portion 21, and emits approximately white light. The color separation optical system 22 separates the approximately white light into light of RGB three primary colors and guides the light of three primary colors to respective liquid crystal panels corresponding thereto. The color synthesis optical system 23 includes R, G, and B liquid crystal panels 231 and a cross dichroic prism 232, and forms respective videos based on R, G, and B signals and performs color synthesis for those videos.

The projection optical system 3 is formed by a projection lens 31 and a lens shifting mechanism 32. Video light emitted from the color synthesis optical system 23 is enlarged and projected onto a screen or the like by the projection lens 31. The lens shifting mechanism 32 holds the projection lens 31 and moves it in two axial directions perpendicular to an optical axis (projection direction), and includes a horizontal direction (X direction) driving portion $32x$ and a vertical direction (Y direction) driving portion $32y$. To a lens attaching surface $32a$ of the lens shifting mechanism 32, the projection lens 31 is fixed. Thus, a position of an image projected onto the screen can be moved and adjusted in the horizontal direction and the vertical direction.

In this example, the optical engine 2 and the projection optical system 3 are attached to the case 1 while being integrally fixed to the common base 4. More specifically, an outgoing end portion of the tube-shaped light guide 20 and the color synthesis optical system 23 of the optical engine 2 are fixed to the common base 4. Also, the lens shifting mechanism 32 of the projection optical system 3 is fixed to the common base 4.

Figure 4:
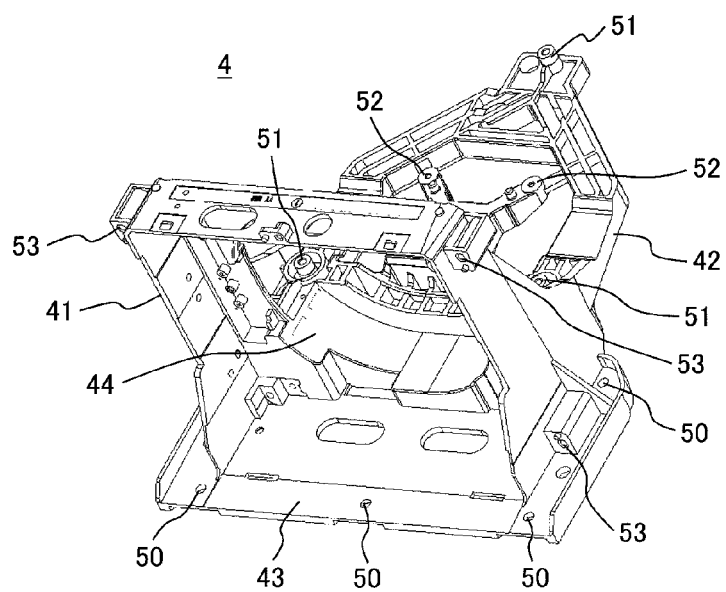
FIG. 4 is a perspective view showing a shape of the common base.

FIG. 4 is a perspective view showing the shape of the common base 4. The common base 4 includes a fixing frame 41 standing in a central portion and pedestal portions 42 and 43 on both sides thereof, and is formed by aluminum die casting, for example, as a member which has high rigidity and is hardly deformable. The fixing frame 41 has an opening 44 through which video light from the optical engine 2 passes. The optical engine 2 is mounted on the pedestal portion 42, the lens shifting mechanism 32 of the projection optical system 3 is mounted on the pedestal portion 43, and they are integrally fixed.

More specifically, as for the optical engine 2 mounted on the pedestal portion 42, what is fixed to the pedestal portion 42 is limited to the outgoing end portion of the light guide 20 and the color synthesis optical system 23, and those are screwed to be fixed to fixing portions 51 (at three positions in this example). The reason for this is the following. The optical engine 2 has a number of optical components from the light source portion 21 to the color synthesis optical system 23, and the dimensions (an optical path length) of the light guide 20 for accommodating those components becomes large. In a case of fixing the whole, the common base 4 increase in size, it is difficult to ensure the rigidity, and the mass increases simultaneously. Therefore, it is unwise to fix the whole optical engine 2 (light guide 20) to the pedestal portion 42.

Moreover, as for the projection optical system 3 mounted on the pedestal portion 43, an incident side of the lens shifting mechanism 32 is fixed to the standing fixing frame 41, while the projection lens 31 is held by the lens attaching surface $32a$ on an outgoing side of the lens shifting mechanism 32.

On the bottom surface of the common base 4, fixing portions 50 for attaching the common base 4 to the case 1 are provided (at five positions in the example of FIG. 4). Those fixing portions 50 are provided near a leg portion of the deformable fixing frame 41 for the purpose of preventing the deformation of the case 1 from extending to the optical engine 2 and the color synthesis optical system 23.

The pedestal portion 42 of the common base 4 is provided with fixing portions 51 for attaching the end portion of the light guide 20 (at three positions in the example of FIG. 4) and fixing portions 52 for attaching the color synthesis optical system 23 (at two positions in the example of FIG. 4). Moreover, the fixing frame 41 of the common base 4 is provided with fixing portions 53 for attaching the lens shifting mechanism 32 (at four positions in the example of FIG. 4).

According to the above structure, the optical engine 2 and the projection optical system 3 are integrally fixed to the common base 4, and only the common base 4 is attached to the case 1. In other words, the optical engine 2 and the projection optical system 3 are not fixed directly to the case 1. Therefore, even when the case 1 has been deformed by an external force, deformation is prevented by the common base 4 having high rigidity, and the optical engine 2 and the projection optical system 3 are not directly affected by the deformation of the case 1. Moreover, since the optical engine 2 (light guide 20) to be fixed to the common base 4 is limited to the outgoing end portion only, an external force is hardly applied to the main body of the light guide 20 and the respective optical components accommodated in the light guide 20 are maintained at predetermined positions with predetermined accuracy. Furthermore, since the optical engine 2 and the projection optical system 3 are fixed to the common base 4 having high rigidity, the positional relationship between both cannot be displaced. Thus, according to the structure of this example, even when an external force or the like is applied, it is possible to maintain the positional accuracy of the respective optical components and prevent deterioration of the quality of a video to be displayed (e.g., occurrence of luminance unevenness, color shift or the like).

REFERENCE SIGN LIST

1 . . . case,
2 . . . optical engine,
3 . . . projection optical system,
4 . . . common base,
20 . . . light guide,
21 . . . light source portion,
22 . . . color separation optical system
23 . . . color synthesis optical system,
231 . . . liquid crystal panel,
232 . . . cross dichroic prism,
31 . . . projection lens,
32 . . . lens shifting mechanism,
$32a$ . . . lens attaching surface,
41 . . . fixing frame,
42, 43 . . . pedestal portion,
44 . . . opening,
50 to 53 . . . fixing portion.

The invention claimed is:

1. A projection video display device for projecting a video formed by a display element, comprising:
a case;
a common base comprising a first and second pedestal portions, wherein the common base is attached to the case;
an optical engine comprising a light guide having a first and second ends, a light source disposed at the first end of the light guide, and a display element disposed at the second end of the light guide, the optical engine arranged to radiate light emitted from a light source onto the display element to form the video, wherein the optical engine is attached to the common base only by a connection between the first pedestal portion of the common base and the second end of the light guide; and a projection optical system arranged to enlarge and project the video emitted from the optical engine, wherein the projection optical system is attached to the second pedestal portion of the common base.

2. The projection video display device according to claim 1, wherein the optical engine includes the light source, a color separation optical system for separating the light emitted from the light source into three primary colors, and a color synthesis optical system for forming respective color videos by the display element and synthesizing the respective color videos, the projection optical system includes a projection lens for enlarging and projecting the video emitted from the color synthesis optical system, and a lens shifting mechanism for holding the projection lens and moving the projection lens in a direction perpendicular to an optical axis of projection light, and an outgoing end portion of a tube-shaped light guide which accommodates the light source and the color separation optical system, the color synthesis optical system, and the lens shifting mechanism are fixed to the common base.

3. The projection video display device according to claim 2, wherein the common base has a standing fixing frame for fixing the lens shifting mechanism, and the common base is attached to the case at a position near a leg portion of the fixing frame.

\* \* \* \* \*